(12) United States Patent
Okuda et al.

(10) Patent No.: US 11,927,435 B2
(45) Date of Patent: Mar. 12, 2024

(54) THREE-DIMENSIONAL MEASUREMENT DEVICE AND THREE-DIMENSIONAL MEASUREMENT METHOD

(71) Applicant: CKD CORPORATION, Aichi (JP)

(72) Inventors: Manabu Okuda, Aichi (JP); Tsuyoshi Ohyama, Aichi (JP); Norihiko Sakaida, Aichi (JP)

(73) Assignee: CKD CORPORATION, Aichi (JP)

( * ) Notice: Subject to any disclaimer, the term of this patent is extended or adjusted under 35 U.S.C. 154(b) by 321 days.

(21) Appl. No.: 17/534,539

(22) Filed: Nov. 24, 2021

(65) Prior Publication Data

US 2022/0082374 A1 Mar. 17, 2022

Related U.S. Application Data

(63) Continuation of application No. PCT/JP2020/017212, filed on Apr. 21, 2020.

(30) Foreign Application Priority Data

Jun. 12, 2019 (JP) .................................. 2019-109740

(51) Int. Cl.
*G01B 11/25* (2006.01)

(52) U.S. Cl.
CPC ...... *G01B 11/2527* (2013.01); *G01B 11/2513* (2013.01); *G01B 11/254* (2013.01)

(58) Field of Classification Search
CPC ............ G01B 11/2527; G01B 11/2513; G01B 11/254
See application file for complete search history.

(56) References Cited

FOREIGN PATENT DOCUMENTS

| JP | 2006-300539 A | 11/2006 | |
|----|---------------|---------|---|
| JP | 2016211986 A | * 12/2016 | ............. G01B 11/25 |
| JP | 2017-009442 A | 1/2017 | |

OTHER PUBLICATIONS

International Preliminary Report on Patentability issued in corresponding International Application No. PCT/JP2020/017212, dated Dec. 23, 2021 (10 pages).
International Search Report issued in corresponding International Application No. PCT/JP2020/017212 dated Aug. 4, 2020 (5 pages).
Written Opinion issued in corresponding International Application No. PCT/JP2020/017212 dated Aug. 4, 2020 (3 pages).

* cited by examiner

*Primary Examiner* — Jamil Ahmed
(74) *Attorney, Agent, or Firm* — Osha Bergman Watanabe & Burton LLP

(57) ABSTRACT

A three-dimensional measurement device performs three-dimensional measurement of a measured object using a phase shift method. The three-dimensional measurement device includes: an irradiator that irradiates the measured object with a predetermined light pattern having a light intensity distribution in a fringe shape; a control device that shifts a phase of the light pattern radiated from the irradiator in N different ways, where N is a natural number of not less than 3; and an imaging device that takes an image of the measured object irradiated with the light pattern. The control device executes three-dimensional measurement of the measured object by the phase shift method based on N different image data taken under the light pattern having the phase shifted in the N different ways.

13 Claims, 7 Drawing Sheets

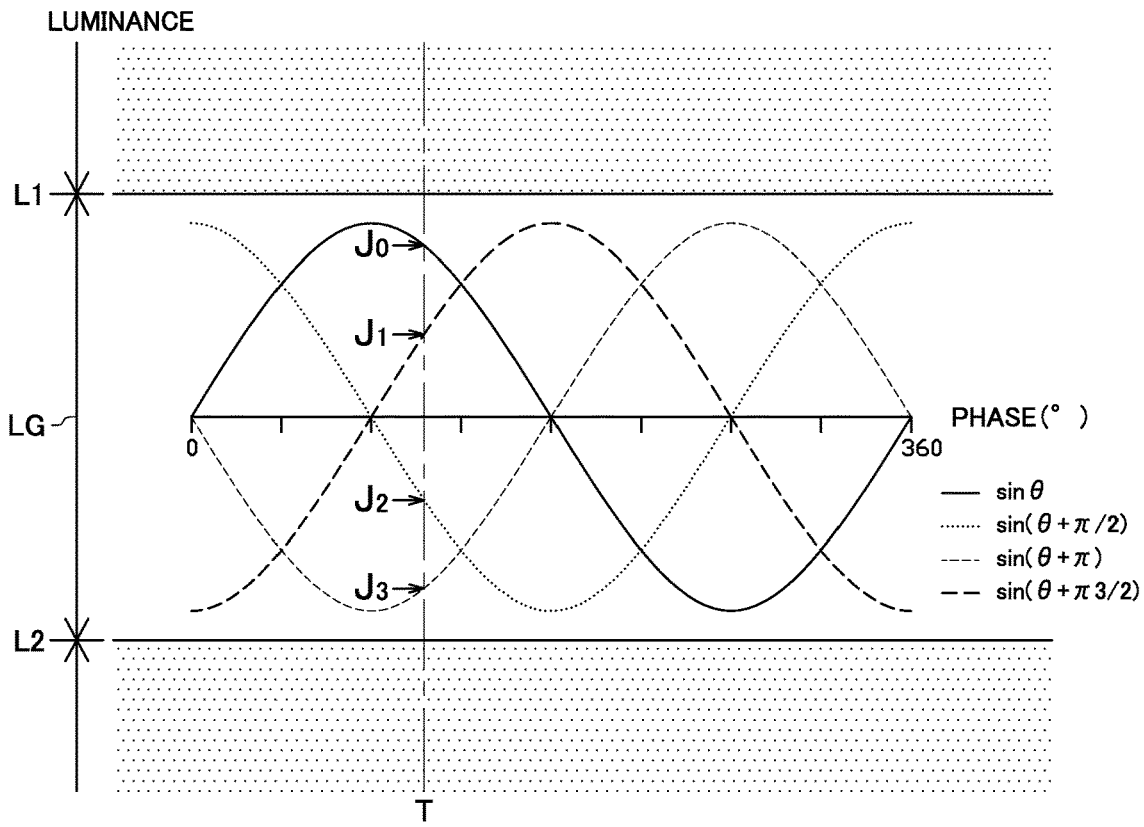
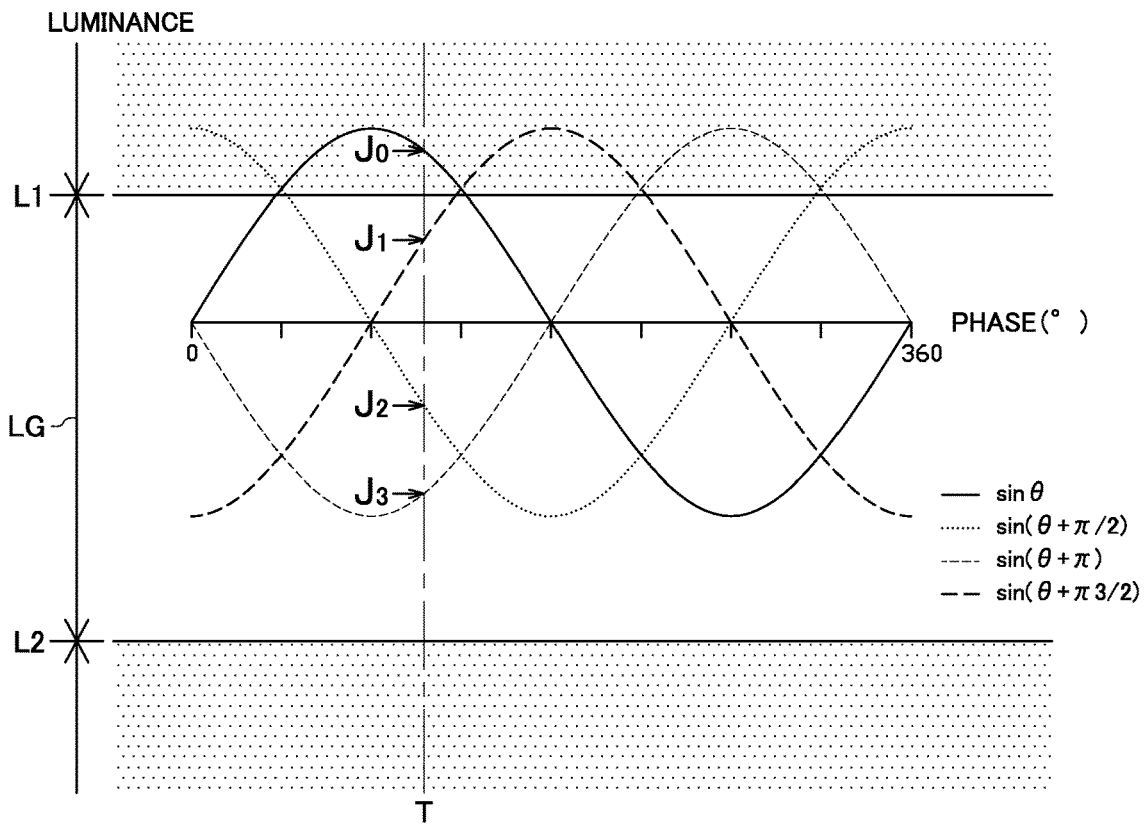

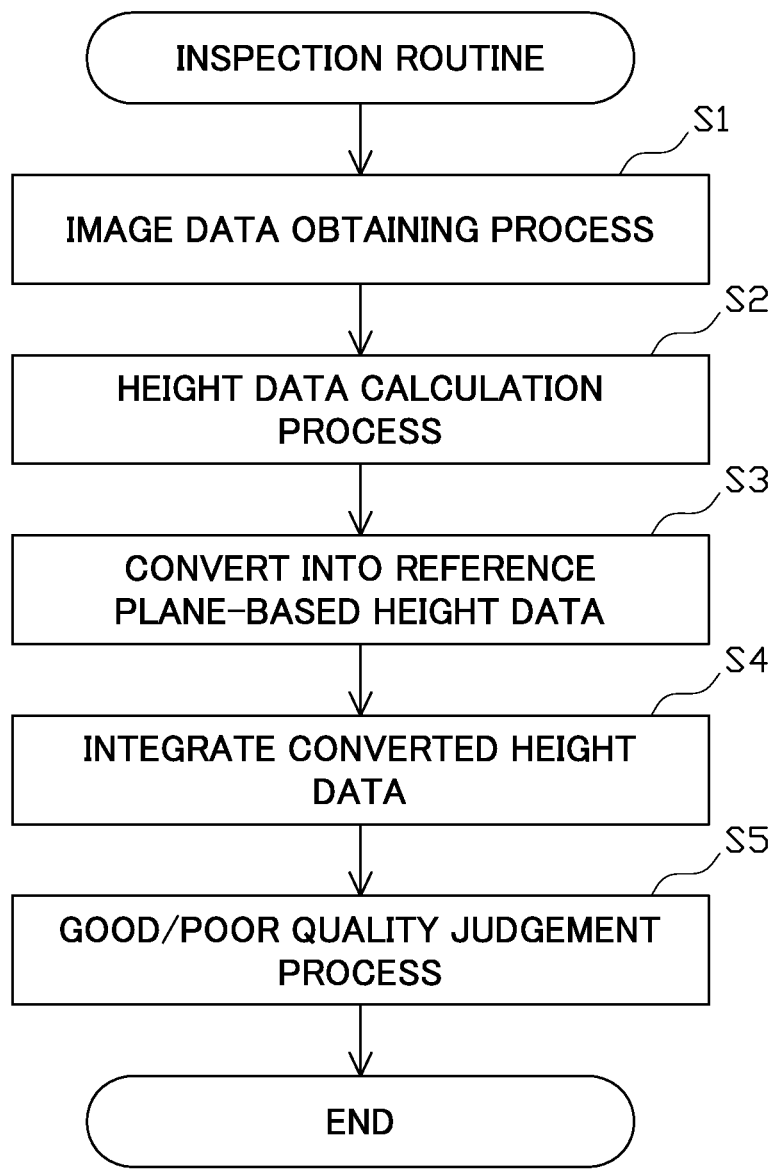

THREE-DIMENSIONAL MEASUREMENT DEVICE AND THREE-DIMENSIONAL MEASUREMENT METHOD

BACKGROUND

Technical Field

The present invention relates to a three-dimensional measurement device configured to perform three-dimensional measurement by utilizing a phase shift method, as well as a three-dimensional measurement method.

Description of Related Art

A printed circuit board generally has an electrode pattern on a base substrate made of a glass epoxy resin and a surface protected by a resist film. In the case of mounting an electronic component on a printed circuit board, a general procedure first prints solder paste at a predetermined position that is not protected by the resist film, on the electrode pattern. The procedure then temporarily fastens the electronic component on the printed circuit board, based on the viscosity of the solder paste. The printed circuit board is then led into a reflow furnace to be subjected to a predetermined reflow process that implements soldering. A recent trend is the need for inspection of the printing state of solder paste in a stage before the printed circuit board is led into the reflow furnace. A three-dimensional measurement device using the phase shift method may be used for such inspection.

The three-dimensional measurement device using the phase shift method includes an irradiation unit configured by combination of a light source that emits predetermined light with a grating that converts the light from the light source into a light pattern having a light intensity distribution in a sinusoidal shape (fringe shape) to irradiate a measured object (in this case, a printed circuit board) with this light pattern. The three-dimensional measurement device then observes points on the substrate with an imaging unit placed immediately above the substrate. The imaging unit employed is, for example, a CCD camera including lenses and an imaging element.

The three-dimensional measurement device of this configuration shifts the phase of the light pattern which the printed circuit board is irradiated with, in multiple different ways (for example, in four different ways, in three different ways, or two different ways) and takes images of the printed circuit board under the light pattern of the shifted phases, so as to obtain multiple different image data. The three-dimensional measurement device then performs three-dimensional measurement by the phase shift method, based on these multiple different image data.

The printed circuit board, however, has bright portions and dark portions. Additionally, a single-plate color image sensor is generally used as the imaging element, and one of color filters of red (R), green (G) and blue (B) having different imageable wavelength regions is placed in each pixel of the imaging element. There is accordingly a light-dark difference due to the effect of color in an imaging object portion.

In such circumstances, there may be a light-dark difference beyond a luminance dynamic range of the imaging element. In an excessively bright portion or in an excessively dark portion, for example, one or two image data may be "overexposed" or "underexposed" among the four image data obtained as described above. This may cause the height measurement to fail to be performed in such a portion.

By taking into account the foregoing, a three-dimensional measurement device that performs measurement by using two different light patterns having different luminances has been proposed recently (as described in, for example, Patent Literature 1 and Patent Literature 2).

For example, the proposed three-dimensional measurement device performs three-dimensional measurement with regard to an inspection object area (solder area) on a printed circuit board, based on image data obtained by irradiation of the inspection object area with a light pattern of a first luminance in multiple different phases, performs three-dimensional measurement with regard to a measurement reference area (background area) on the printed circuit board, based on image data obtained by irradiation of the measurement reference area with a light pattern of a second luminance in multiple different phases, and measures the height of solder paste in the inspection object area relative to the measurement reference area set as a height reference plane.

PATENT LITERATURE

Patent Literature 1: JP 2006-300539A
Patent Literature 2: JP 2017-9442A

As described above, in the conventional three-dimensional measurement device using the phase shift method, however, it is required to shift the phase of the radiated light pattern in four levels (or in three levels or in two levels) and take four different images (or three different images or two different images) having light intensity distributions corresponding to the shifted phases.

Accordingly, like the techniques described in Patent Literature 1 and Patent Literature 2, in the case of performing measurement with switching two different light patterns having different luminances, the procedure irradiates a measurement object with the first light pattern of the first luminance, shifts the phase in four different levels (or in three different levels or in two different levels), takes four different images (or three different images or two different images) under the first light pattern of the shifted phases, changes the luminance, irradiates the measurement object with the second light pattern of the second luminance, shifts the phase in four different levels (or in three different levels or in two different levels), and takes four different images (or three different images or two different images) under the second light pattern of the shifted phases. This procedure requires irradiation and imaging four times (or three times or two times) under the light pattern of each luminance and thereby requires two sets, i.e., a total of eight times (or six times or four times) of irradiation and imaging. This is likely to significantly increase the measurement time.

In the case where a large number of measurement object ranges are set on one printed circuit board, the time required for measurement of this one printed circuit board is increased to several times. There is accordingly a demand for further shortening the measurement time.

The above demand is not limited for the height measurement of solder paste or the like printed on the printed circuit board but is also in the field of other three-dimensional measurement devices.

SUMMARY

One or more embodiments of the present invention provide a three-dimensional measurement device and a three-dimensional measurement method that achieve high-speed measurement in the process of performing three-dimensional measurement by using a phase shift method.

The following describes each of various aspects provided adequately to deal with the issues described above. Functions and advantageous effects that are characteristic of each of the aspects are also described as appropriate.

Aspect 1. There is provided a three-dimensional measurement device configured to perform three-dimensional measurement of a predetermined measured object (for example, a printed circuit board) by using a phase shift method. The three-dimensional measurement device comprises an irradiation unit (i.e., an irradiator) configured to irradiate the measured object with a predetermined light pattern having a light intensity distribution in a fringe shape; a phase controller (i.e., a control device) configured to shift a phase of the light pattern radiated from the irradiation unit in N different ways, where N is a natural number of not less than 3; an imaging unit (i.e., an imaging device) configured to take an image of the measured object irradiated with the light pattern; and an image processing module (i.e., the control device) configured to perform (or execute) three-dimensional measurement of the measured object by the phase shift method, based on N different image data taken and obtained under the light pattern having the phase shifted in the N different ways. The image processing module is configured to perform (or execute): a process of obtaining N luminance values with respect to a predetermined coordinate position on the image data, based on the N different image data; a process of extracting not less than two but less than N luminance values that are neither overexposed nor underexposed, among the N luminance values with respect to the predetermined coordinate position; and a process of performing height measurement at the predetermined coordinate position, based on the not less than two but less than N luminance values.

The term "overexposed" herein indicates the state that a luminance value at a predetermined coordinate position (pixel) of image data is higher than a predetermined high luminance level, for example, an upper limit value of a luminance dynamic range of the imaging unit and that the brightness is not adequately expressible by the tone.

The term "underexposed" herein, on the other hand, indicates the state that a luminance value at a predetermined coordinate position (pixel) of image data is lower than a predetermined low luminance level, for example, a lower limit value of the luminance dynamic range of the imaging unit and that the lightness (darkness) is not adequately expressible by the tone.

The configuration of the above aspect 1 shifts the phase of the light pattern which the measured object is irradiated with, in the N different ways (where N is a natural number of not less than 3) and takes images under respective light patterns having the different phases, so as to obtain N different image data.

In the process of performing three-dimensional measurement by the phase shift method based on these N different image data, the configuration of this aspect extracts not less than two but less than N luminance values that are neither overexposed nor underexposed, among N luminance values with respect to the predetermined coordinate position on the image data and performs height measurement at the predetermined coordinate position, based on the extracted not less than two but less than N luminance values.

Accordingly, even when part of the N luminance values is "overexposed or "underexposed" at the predetermined coordinate position, the configuration of this aspect enables height measurement to be performed by using the not less two but less than N remaining luminance values that are neither "overexposed" nor "underexposed".

This configuration expands the luminance dynamic range. As a result, this does not require to perform height measurement multiple number of times (in multiple sets) with changing the luminance conditions, and thereby increases the speed of measurement. Additionally, this configuration enables height measurement data having a less data missing part to be obtained and thereby enhances the measurement accuracy.

Aspect 2. There is provided a three-dimensional measurement device configured to perform three-dimensional measurement of a predetermined measured object (for example, a printed circuit board) by using a phase shift method. The three-dimensional measurement device comprises an irradiation unit configured to irradiate the measured object with a predetermined light pattern having a light intensity distribution in a fringe shape; a phase controller configured to shift a phase of the light pattern radiated from the irradiation unit by 90 degrees each in four different ways; an imaging unit configured to take an image of the measured object irradiated with the light pattern; and an image processing module configured to perform three-dimensional measurement of the measured object by the phase shift method, based on four different image data taken and obtained under the light pattern having the phase shifted in the four different ways. The image processing module is configured to perform: a process of obtaining four luminance values with respect to a predetermined coordinate position on the image data, based on the four different image data; a process of extracting three or more luminance values that are neither overexposed nor underexposed, among the four luminance values with respect to the predetermined coordinate position; and a process of performing height measurement at the predetermined coordinate position, based on the three or more luminance values.

The configuration of the above aspect 2 has similar functions and advantageous effects to those of the aspect 1 described above. In the process of performing height measurement by using the phase shift method, using four or three luminance values for height calculation facilitates the calculation process and is likely to obtain the measurement result of the high accuracy. As a result, the configuration of this aspect further increases the speed of measurement and further improves the measurement accuracy.

Aspect 3. There is provided a three-dimensional measurement device configured to perform three-dimensional measurement of a predetermined measured object (for example, a printed circuit board) by using a phase shift method. The three-dimensional measurement device comprises a first irradiation unit configured to irradiate the measured object with a first light pattern having a light intensity distribution in a fringe shape; a first phase controller configured to shift a phase of the first light pattern radiated from the first irradiation unit in N different ways, where N is a natural number of not less than 3; a second irradiation unit configured to irradiate the measured object with a second light pattern having a light intensity distribution in a fringe shape; a second phase controller configured to shift a phase of the second light pattern radiated from the second irradiation unit in N different ways, where N is a natural number of not less than 3; an imaging unit configured to take an image of the measured object irradiated with the first light pattern or with the second light pattern; and an image processing module configured to perform three-dimensional measurement of the measured object, based on image data obtained by the imaging unit. The image processing module is configured to perform first height measurement, based on N different image data taken and obtained under the first light pattern having the phase shifted in the N different ways. The image processing module is configured to perform second height measurement, based on N different image data taken and obtained under the second light pattern having the phase shifted in the N different ways. The image processing module is configured to perform a process of calculating height measurement data with regard to the measured object, based on a measurement result of the first height measurement and a measurement result of the second height measurement. In a process of performing the first height measurement and the second height measurement, the image processing module is configured to perform: a process of obtaining N luminance values with respect to a predetermined coordinate position on the image data, based on the N different image data; a process of extracting not less than two but less than N luminance values that are neither overexposed nor underexposed, among the N luminance values with respect to the predetermined coordinate position; and a process of performing height measurement at the predetermined coordinate position, based on the not less than two but less than N luminance values. In a process of calculating the height measurement data, when there is a difference between a number of luminance values that are neither overexposed nor underexposed and that are used for calculation of the measurement result of the first height measurement and a number of luminance values that are neither overexposed nor underexposed and that are used for calculation of the measurement result of the second height measurement, the image processing module is configured to obtain the measurement result based on the larger number of luminance values, as the height measurement data or to obtain a calculation result by processing the measurement result based on the larger number of luminance values by a predetermined weight, as the height measurement data.

The configuration of the above aspect 3 has similar functions and advantageous effects to those of the aspect 1 described above. Especially, the configuration of this aspect performs the first height measurement based on the N different image data taken and obtained under the first light pattern, performs the second height measurement based on the N different image data taken and obtained under the second light pattern, and calculates the height measurement data with regard to the measured object, based on results of these two height measurements.

Furthermore, in the process of calculating the height measurement data with regard to the measured object based on the results of these two height measurements, when there is a difference between the numbers of luminance values that are neither overexposed nor underexposed and that are used for calculation of the results of the respective measurements (for example, the result of one measurement is based on four luminance values and the other is based on three luminance values), the configuration of this aspect obtains the result of the measurement based on the larger number of luminance values, as the height measurement data, or obtains a calculation result by processing the result of the measurement based on the larger number of luminance values by a predetermined weight, as the height measurement data.

As a result, this configuration performs measurement using the larger number of luminance values that are neither overexposed nor underexposed and enables height measurement data having a further less data missing part to be obtained, thereby further enhancing the measurement accuracy.

Aspect 4. In the three-dimensional measurement device described in any one of the above aspects 1 to 3, the image processing module may individually determine whether a luminance value with respect to each coordinate position on the image data is a luminance value that is neither overexposed nor underexposed.

The configuration of the above aspect 4 enables the determination of whether the luminance value is neither overexposed nor underexposed to be readily performed with high accuracy.

Aspect 5. In the three-dimensional measurement device described in any one of the above aspects 1 to 4, the measured object may be a printed circuit board with solder paste printed thereon or a wafer substrate with a solder bump formed thereon.

The configuration of the above aspect 5 performs height measurement or the like of the solder paste printed on the printed circuit board or the solder bump formed on the wafer substrate. In an inspection of the solder paste or the solder bump, the configuration of this aspect then enables good/poor quality judgment of the solder paste or the solder bump to be performed, based on the measurement value. Accordingly, this configuration has the functions and the advantageous effects of the respective aspects described above in this inspection and ensures the efficient good/poor quality judgment with high accuracy. As a result, this configuration improves the inspection efficiency and the inspection accuracy of a solder printing inspection apparatus or of a solder bump inspection apparatus.

Aspect 6. There is provided a three-dimensional measurement method of performing three-dimensional measurement of a predetermined measured object (for example, a printed circuit board) by using a phase shift method. The three-dimensional measurement method comprises an irradiation process of irradiating the measured object with a predetermined light pattern having a light intensity distribution in a fringe shape; a phase control process of shifting a phase of the light pattern radiated from the irradiation unit in N different ways, where N is a natural number of not less than 3; an imaging process of taking an image of the measured object irradiated with the light pattern; and an image processing process of performing three-dimensional measurement of the measured object by the phase shift method, based on N different image data taken and obtained under the light pattern having the phase shifted in the N different ways. The image processing process comprises: a process of obtaining N luminance values with respect to a predetermined coordinate position on the image data, based on the N different image data; a process of extracting not less than two but less than N luminance values that are neither overexposed nor underexposed, among the N luminance values with respect to the predetermined coordinate position; and a process of performing height measurement at the predetermined coordinate position, based on the not less than two but less than N luminance values.

The configuration of the aspect 6 described above has similar functions and advantageous effects to those of the aspect 1 described above.

BRIEF DESCRIPTION OF DRAWINGS

FIG. 3 is a graph showing a relationship between the luminance value of a light pattern and the luminance dynamic range of an imaging element in the state that all luminance values are neither overexposed nor underexposed;

FIG. 4 is a graph showing a relationship between the luminance value of the light pattern and the luminance dynamic range of the imaging element in the state that part of the luminance values are overexposed;

FIG. 9 is a flowchart showing an inspection routine according to another embodiment.

DETAILED DESCRIPTION OF EMBODIMENTS

First Embodiment

Figure 1:
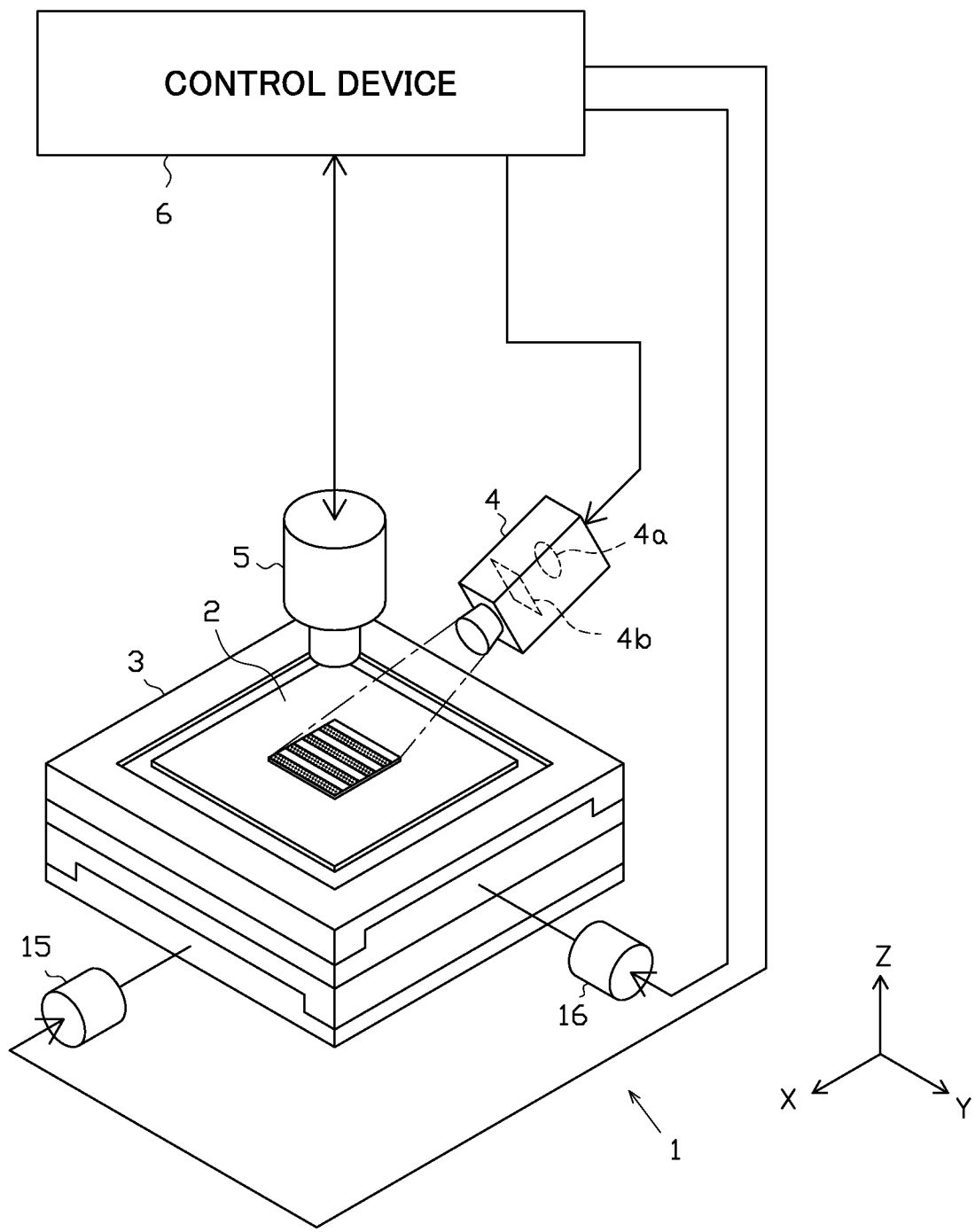
FIG. 1 is a schematic configuration diagram schematically illustrating a substrate inspection apparatus.

The following describes one embodiment with reference to drawings. FIG. 1 is a schematic configuration diagram schematically illustrating a substrate inspection apparatus 1 provided with a three-dimensional measurement device according to this embodiment. As illustrated in this drawing, the substrate inspection apparatus 1 includes a mounting table 3 on which a printed circuit board 2 as a measured object with solder paste, which is a measurement object, printed thereon is placed; an illumination device 4 serving as an irradiation unit or irradiator configured to irradiate a surface of the printed circuit board 2 obliquely downward with a predetermined light pattern; a camera 5 serving as an imaging unit or imaging device configured to take an image of a portion irradiated with the light pattern on the printed circuit board 2; and a control device 6 configured to perform various controls, image processing and arithmetic operations in the substrate inspection apparatus 1.

The mounting table 3 is provided with motors 15 and 16, which are driven and controlled by the control device 6 to slide the printed circuit board 2 placed on the mounting table 3 in an arbitrary direction (in an X-axis direction and in a Y-axis direction).

The illumination device 4 includes a light source 4a configured to emit predetermined light; and a liquid crystal grating 4b configured to convert the light emitted from the light source 4a into a light pattern having a light intensity distribution in a sinusoidal shape (fringe shape). The illumination device 4 is configured to irradiate the printed circuit board 2 obliquely downward with the light pattern in the fringe shape having multiple different phases (the phase shifted by ¼ pitch each, "0 degree", "90 degrees", "180 degrees" and "270 degrees" according to the embodiment). A mechanism of performing switching control of the grating mode in the liquid crystal grating 4b corresponds to the phase controller.

More specifically, in the illumination device 4, the light emitted from the light source 4a is led through optical fibers into a pair of condenser lenses to become parallel light. This parallel light is led to a projection lens via the liquid crystal grating 4b. The printed circuit board 2 is then irradiated with the light pattern in the fringe shape output from the projection lens.

The liquid crystal grating 4b includes a liquid crystal layer formed between a pair of transparent substrates, a common electrode placed on one transparent substrate, and a plurality of strip electrodes arranged in parallel on the other transparent substrate to be opposed to the common electrode. Switching elements (thin film transistors or the like) connected with the respective strip electrodes are controlled on and off by a driving circuit to control voltages that are applied to the respective strip electrodes. Such control switches the light transmittances of respective grating lines corresponding to the respective strip electrodes to form a grating pattern in the fringe shape including "bright portions" of the high light transmittance and "dark portions" of the low light transmittance. The light which the printed circuit board 2 is irradiated with via the liquid crystal grating 4b is a light pattern having a light intensity distribution in a sinusoidal shape, due to blurring and the like caused by diffraction effect.

According to the embodiment, the illumination device 4 is set to radiate each light pattern along the X-axis direction to be parallel to a pair of sides of the printed circuit board 2 in a rectangular shape. Accordingly, the fringes of the radiated light pattern are perpendicular to the X-axis direction and are parallel to the Y-axis direction.

The camera 5 includes lenses, an imaging element and the like. The imaging element employed herein is a single-plate CMOS sensor. Image data taken by the camera 5 is converted into a digital signal inside of the camera 5, is input in the form of the digital signal into the control device 6, and is stored in an image data storage device 24 described later. The control device 6 performs image processing, an inspection process and the like, based on the image data, as described later. From this point of view, the control device 6 configures the image processing module according to the embodiment.

Figure 2:
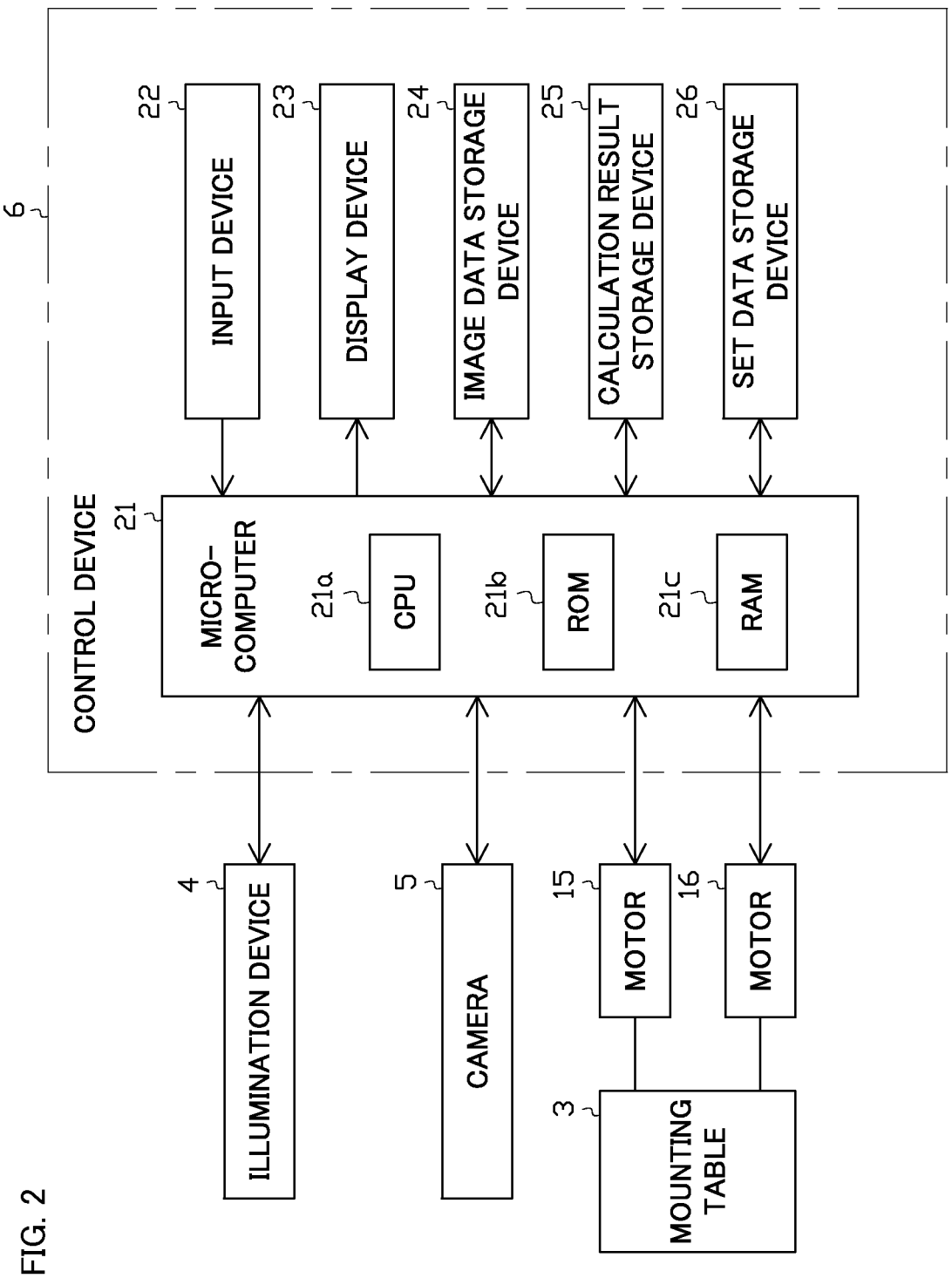
FIG. 2 is a block diagram illustrating the electrical configuration of the substrate inspection apparatus.

The following describes the electrical configuration of the control device 6. As shown in FIG. 2, the control device 6 includes a microcomputer 21 configured to control the entire substrate inspection device 1; an input device 22 serving as the "input unit" configured by a keyboard and a mouse, by a touch panel or the like; a display device 23 serving as the "display unit" including a display screen such as a CRT or a liquid crystal display; an image data storage device 24 configured to store image data and the like taken and obtained by the camera 5; a calculation result storage device 25 configured to store results of variation calculations, for example, results of three-dimensional measurement obtained based on the image data; and a set data storage device 26 configured to store various information, such as Gerber data and calibration data, in advance.

The microcomputer 21 includes a CPU 21a serving as an arithmetic device, a ROM 21b configured to store various programs, and a RAM 21c configured to temporarily store various data, such as calculation data and input/output data and is electrically connected with the respective devices 22 to 26 described above. The microcomputer 21 serves to control input and output of various data and signals to and from, for example, these respective devices 22 to 26.

An inspection procedure of the printed circuit board 2 by the substrate inspection device 1 is described below in detail. The inspection procedure first performs calibration for the purpose of understanding a variation in the light pattern (phase distribution).

In the liquid crystal grating 4b, there is a variation in the voltages applied to the respective strip electrodes, due to a variation in the characteristics (for example, offset and gain) of respective transistors connected with the respective strip electrodes. This causes a variation in the light transmittance (luminance level) with respect to each line corresponding to each strip electrode even in one identical "bright portion" or in one identical "dark portion". As a result, the light pattern which the measured object is irradiated with fails to have an ideal light intensity distribution in a sinusoidal shape and is thus likely to cause an error in the results of three-dimensional measurement.

Accordingly, calibration or the like is performed for the purpose of understanding a variation in the light pattern (phase distribution) in advance.

A procedure of calibration first provides a reference plane that has a height position of 0 and that has a planar surface, separately from the printed circuit board 2. The reference plane has an identical color with the color of solder paste that is the measurement object. Accordingly, the solder paste and the light pattern have identical degrees of reflection.

The procedure of calibration subsequently irradiates the reference plane described above with the light pattern and takes an image of the irradiated reference plane by the camera 5, so as to obtain image data including luminance values at respective coordinate positions. According to this embodiment, the procedure of calibration shifts the phase of the light pattern by 90 degrees each to obtain four different image data taken under the respective phase-shifted light patterns.

The control device 6 then calculates a phase angle θ of the light pattern at each coordinate position (in each pixel) from the four different image data described above and stores the calculated phase angles as calibration data into the set data storage device 26.

According to the embodiment, the control device 6 also specifies a gain B, an offset A, and a relationship between the gain B and the offset A of the light pattern at the respective coordinate positions, based on the four different image data described above, and stores these specified data as calibration data into the set data storage device 26.

A procedure of calculating the gain B and the offset A is described in detail. Relationships of the gain B and the offset A to luminance values ($I_0$, $I_1$, $I_2$, $I_3$) at the respective coordinate positions of the four different image data are expressed by expressions (1), (2), (3) and (4) given below:

[Math. 1]

$$I_0 = A + B \sin \theta \quad (1)$$

$$I_1 = A + B \sin(\theta + 90°) = A + B \cos \theta \quad (2)$$

$$I_2 = A + B \sin(\theta + 180°) = A + B \cos(\theta + 90°) \quad (3)$$
$$= A - B \sin \theta$$

$$I_3 = A + B \sin(\theta + 270°) = A + B \cos(\theta + 180°) \quad (4)$$
$$= A - B \sin(\theta + 90°)$$
$$= A - B \cos \theta$$

The above expressions (1), (2), (3) and (4) are written as expressions (1'), (2'), (3') and (4') given below:

[Math. 2]

$$\sin \theta = (I_0 - A)/B \quad (1')$$

$$\cos \theta = (I_1 - A)/B \quad (2')$$

$$\sin \theta = (A - I_2)/B \quad (3')$$

$$\cos \theta = (A - I_3)/B \quad (4')$$

An expression (5) given below is derived by summing up the luminance values ($I_0$, $I_1$, $I_2$, $I_3$) at the respective coordinate positions of the four different image data and rearranging the expressions (1), (2), (3) and (4) given above as shown in [Math. 3] given below:

[Math. 3]

$$I_0 + I_1 + I_2 + I_3 = \quad (5)$$
$$(A + B \sin \theta) + (A + B \cos \theta) + (A - B \sin \theta) + (A - B \cos \theta) = 4A$$

$$A = (I_0 + I_1 + I_2 + I_3)/4$$

An expression (6) given below is derived by rearranging the expressions (1) and (3) given above as shown in [Math. 4] given below:

[Math. 4]

$$I_0 - I_2 = B \sin \theta$$

$$\sin \theta = (I_0 - I_2)/2B \quad (6)$$

An expression (7) given below is derived by rearranging the expressions (2) and (4) given above as shown in [Math. 5] given below:

[Math. 5]

$$I_1 - I_3 = 2B \cos \theta$$

$$\cos \theta = (I_1 - I_3)/2B \quad (7)$$

An expression (9) given below is derived by substituting the above expressions (6) and (7) into an expression (8) given below and rearranging the expression (8) as shown in [Math. 6] given below:

[Math. 6]

$$1 = \sin^2 \theta + \cos^2 \theta \quad (8)$$

$$1 = \{(I_0 - I_2)/2B\}^2 + \{(I_1 - I_3)/2B\}^2$$

$$4B^2 = (I_0 - I_2)^2 + (I_1 - I_3)^2$$

-continued $$B = \sqrt{\frac{(I_0 - I_2)^2 + (I_1 - I_3)^2}{4}} \quad (9)$$

$$B > 0$$

A proportional constant K of the gain B and the offset A is then calculated by an expression (10) given below, which is derived from the expressions (5) and (9) given above:

[Math. 7]

$$K = B/A = \frac{\sqrt{\frac{(I_0 - I_2)^2 + (I_1 - I_3)^2}{4}}}{\frac{I_0 + I_1 + I_2 + I_3}{4}} \quad (10)$$

$$= 2 \times \frac{\sqrt{(I_0 - I_2)^2 + (I_1 - I_3)^2}}{I_0 + I_1 + I_2 + I_3}$$

The gain B, the offset A, and the proportional constant K of the light pattern at the respective coordinate positions calculated as described above are stored as calibration data into the set data storage device 26.

The following describes in detail an inspection routine performed with respect to each inspection area. This inspection routine is performed by a control device 6.

The control device 6 first drives and controls the motors 15 and 16 to move the printed circuit board 2 and to adjust the field of view of the camera 5 to a predetermined inspection area on the printed circuit board 2. The inspection area herein is one of divisional areas obtained by dividing the surface of the printed circuit board 2 in advance in the size of the field of view of the camera 5 as one unit.

After conclusion of the positioning of the inspection area, the control device 6 performs switching control of the liquid crystal grating 4b of the illumination device 4, so as to set the position of a grating pattern formed in the liquid crystal grating 4b to a predetermined reference position (position of a phase "0 degree"). The process of switching the position of the grating pattern configures the phase control process according to the embodiment (the same applies hereinafter).

After completion of switching and setting of the liquid crystal grating 4b, the control device 6 turns on the light source 4a to start irradiation of the inspection area with a predetermined light pattern and drives and controls the camera 5 to start imaging of the inspection area irradiated with the light pattern. The process of irradiating the inspection area with the light pattern configures the irradiation process, and the process of imaging the irradiated inspection area by the camera 5 constitutes the imaging process according to the embodiment (the same applies hereinafter).

After elapse of a predetermined time period (for example, 2 msec), the control device 6 terminates radiation of the light pattern and then concludes the first imaging operation with regard to the light pattern. The image data taken by the camera 5 is transferred to and stored into the image data storage device 24 (the same applies hereinafter).

The control device 6 subsequently performs switching control of the liquid crystal grating 4b of the illumination device 4 to switch the position of the grating pattern formed in the liquid crystal grating 4b from the reference position (the position of the phase "0 degree") to a position of a phase "90 degrees" where the phase of the light pattern is shifted by ¼ pitch.

After completion of switching and setting of the liquid crystal grating 4b, the control device 6 turns on the light source 4a to start irradiation of the inspection area with the predetermined light pattern and drives and controls the camera 5 to start imaging of the inspection area irradiated with the light pattern.

After elapse of the predetermined time period, the control device 6 terminates radiation of the light pattern and then concludes the second imaging operation with regard to the light pattern.

The control device 6 subsequently performs switching control of the liquid crystal grating 4b of the illumination device 4 to switch the position of the grating pattern formed in the liquid crystal grating 4b from the position of the phase "90 degrees" to a position of a phase "180 degrees" where the phase of the light pattern is shifted by another ¼ pitch.

After completion of switching and setting of the liquid crystal grating 4b, the control device 6 turns on the light source 4a to start irradiation of the inspection area with the predetermined light pattern and drives and controls the camera 5 to start imaging of the inspection area irradiated with the light pattern.

After elapse of the predetermined time period, the control device 6 terminates radiation of the light pattern and then concludes the third imaging operation with regard to the light pattern.

The control device 6 subsequently performs switching control of the liquid crystal grating 4b of the illumination device 4 to switch the position of the grating pattern formed in the liquid crystal grating 4b from the position of the phase "180 degrees" to a position of a phase "270 degrees" where the phase of the light pattern is shifted by another ¼ pitch.

After completion of switching and setting of the liquid crystal grating 4b, the control device 6 turns on the light source 4a to start irradiation of the inspection area with the predetermined light pattern and drives and controls the camera 5 to start imaging of the inspection area irradiated with the light pattern.

After elapse of the predetermined time period, the control device 6 terminates radiation of the light pattern and then concludes the fourth imaging operation with regard to the light pattern.

The series of image obtaining process described above obtains image data of four picture planes taken under the light pattern having the phase shifted in four different ways.

The control device 6 subsequently performs three-dimensional measurement with regard to the inspection area by a phase shift method, based on the four different image data obtained as described above. This processing process configures the image processing process according to the embodiment.

More specifically, when all four luminance values at a predetermined coordinate position in the above four different image data are neither "overexposed (halation)" nor "underexposed (black crushing)", the control device 6 calculates a phase θ of the light pattern at the predetermined coordinate position, based on these four luminance values like the conventional procedure.

Determination of whether the luminance value at a predetermined coordinate position in each image data is "overexposed" or not or is "underexposed" or not may be performed as described below. For example, in a configuration of expressing the luminance values by gradation expression of "0" to "255", when the luminance value is equal to or lower than a level "5" that is an underexposed luminance level, the luminance value is determined to be "underexposed". When the luminance value is equal to or higher than "250" that is an overexposed luminance level, the luminance value is determined to be "overexposed".

As shown in FIG. 3, in the process of determining a phase T of a light pattern with respect to a predetermined coordinate position, when four luminance values $J_0$, $J_1$, $J_2$ and $J_3$ with respect to the coordinate position are all within a luminance dynamic range LG, i.e., are lower than an overexposed luminance level L1 and are higher than an underexposed luminance level L2 of the imaging element of the camera 5, the phase T of the light pattern with respect to the coordinate position is calculated, based on these four luminance values $J_0$, $J_1$, $J_2$ and $J_3$, like the conventional procedure.

The luminance values $I_0$, $I_1$, $I_2$, and $I_3$ with respect to each coordinate position in the four different image data described above may be expressed by the expressions (1), (2), (3) and (4) given above and may thus be expressed by the expressions (F), (2'), (3') and (4').

An expression (11) given below is derived by solving the above expressions (1), (2), (3) and (4) with regard to the phase θ:

[Math. 8]

$$\tan \theta = \sin \theta / \cos \theta \qquad (11)$$
$$= (I_0 - I_2)/(I_1 - I_3)$$
$$\theta = \tan^{-1}\{(I_0 - I_2)/(I_1 - I_3)\}$$

When one of the four luminance values with respect to the predetermined coordinate position in the four different image data is "overexposed", the phase θ of the light pattern with respect to the coordinate position is calculated, based on the three remaining "non-overexposed" luminance values other than the "overexposed" luminance value.

For example, as shown in FIG. 4, in the process of determining the phase T of the light pattern with respect to the predetermined coordinate position, when one luminance value $J_0$ is "overexposed" (is higher than the overexposed luminance level L1) among the four luminance values $J_0$, $J_1$, $J_2$ and $J_3$ with respect to the coordinate position, the phase T of the light pattern with respect to the coordinate position is calculated, based on the three remaining "non-overexposed" luminance values $J_1$, $J_2$ and $J_3$ (that are lower than the overexposed luminance level L1).

This configuration enables the phase θ of the light pattern to be calculated, even when a range of approximately 15 to 50% of the amplitude of the light pattern (shown in FIG. 4) is higher than the overexposed luminance level L1 of the imaging element.

Similarly, when one of the four luminance values with respect to the predetermined coordinate position in the four different image data is "underexposed", the phase θ of the light pattern with respect to the coordinate position is calculated, based on the three remaining "non-underexposed" luminance values other than the "underexposed" luminance value.

Figure 5:
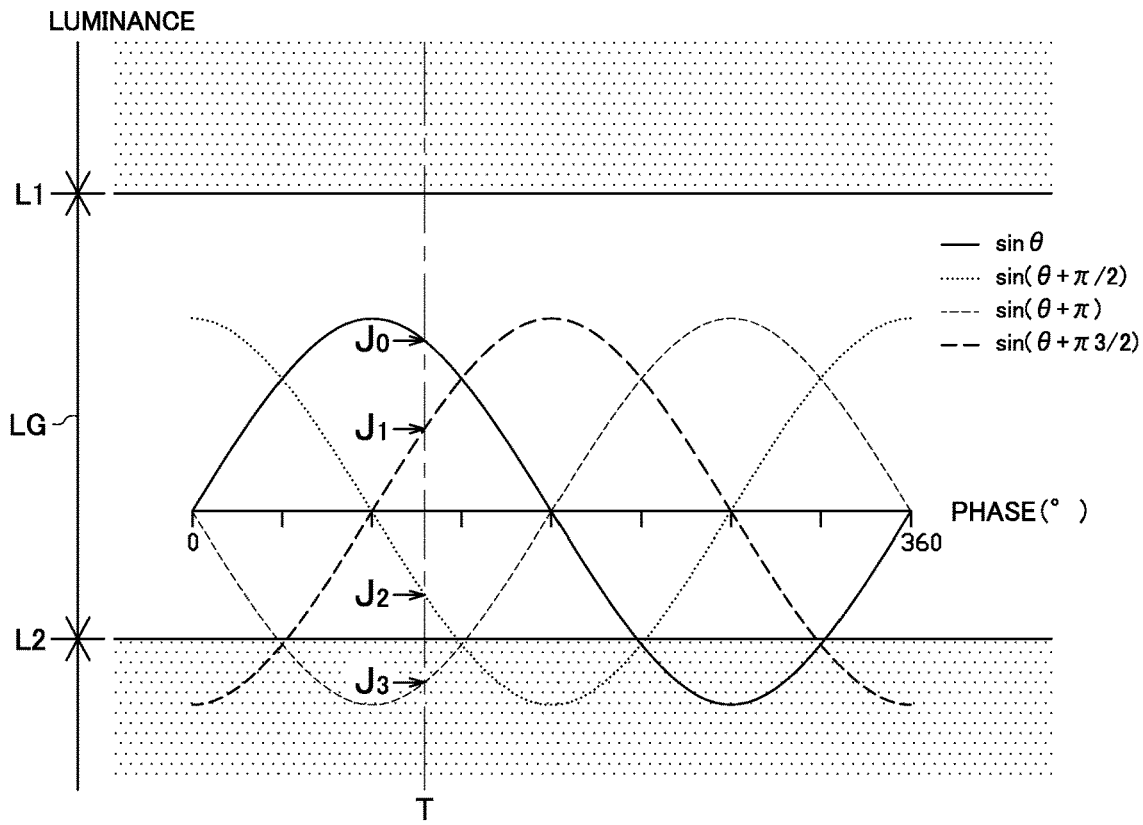
FIG. 5 is a graph showing a relationship between the luminance value of the light pattern and the luminance dynamic range of the imaging element in the state that part of the luminance values are underexposed.

For example, as shown in FIG. 5, in the process of determining the phase T of the light pattern with respect to the predetermined coordinate position, when one luminance value $J_3$ is "underexposed" (is lower than the underexposed luminance level L2) among the four luminance values $J_0$, $J_1$, $J_2$ and $J_3$ with respect to the coordinate position, the phase T of the light pattern with respect to the coordinate position is calculated, based on the three remaining "non-underexposed" luminance values $J_0$, $J_1$ and $J_2$ (that are higher than the underexposed luminance level L2).

This configuration enables the phase θ of the light pattern to be calculated, even when a range of approximately 15 to 50% of the amplitude of the light pattern (shown in FIG. 5) is lower than the underexposed luminance level L2 of the imaging element.

For example, when the luminance value $I_3$ is "overexposed" or "underexposed" among the luminance values $I_0$, $I_1$, $I_2$, and $I_3$ with respect to each coordinate position in the four different image data described above, the offset A is expressed by an expression (12) given below by rearranging the above expressions (1), (2) and (3) as shown in [Math. 9] given below:

[Math. 9]

$$I_0 - I_2 = (A + B \sin \theta) - (A - B \sin \theta) \qquad (12)$$
$$= 2B \sin \theta$$
$$B = (I_0 - I_2)/2 \sin \theta$$
$$I_0 = A + \{(I_0 - I_2)/2 \sin \theta\} \times \sin \theta$$
$$2I_0 = 2A + I_0 - I_2$$
$$2A = I_0 + I_2$$
$$A = (I_0 + I_2)/2$$

An expression (13) given below is derived by solving the above expression (12) with regard to the phase θ based on the above expressions (1') and (2') as shown in [Math. 10] given below:

[Math. 10]

$$\tan \theta = \sin \theta / \cos \theta \qquad (13)$$
$$= \{(I_0 - A)/B\}/\{(I_1 - A)/B\}$$
$$= (I_0 - A)/(I_1 - A)$$
$$= \{I_0 - (I_0 + I_2)/2\}/\{I_1 - (I_0 + I_2)/2\}$$
$$= \{2I_0 - I_0 - I_2\}/\{2I_1 - I_0 - I_3\}$$
$$= \{I_0 - I_2\}/\{2I_1 - I_0 - I_2\}$$
$$\theta = \tan^{-1}\{(I_0 - I_2)/(2I_1 - I_0 - I_2)\}$$

For example, when the luminance value $I_1$ is "overexposed" or "underexposed" among the luminance values $I_0$, $I_1$, $I_2$, and $I_3$ with respect to each coordinate position in the four different image data described above, an expression (14) given below is derived by solving the above expression (12) with regard to the phase θ based on the above expressions (1') and (4') as shown in [Math. 11] given below:

[Math. 11]

$$\tan \theta = \sin \theta / \cos \theta \qquad (14)$$
$$= \{(I_0 - A)/B\}/\{(A - I_3)/B\}$$
$$= (I_0 - A)/(A - I_3)$$
$$= \{I_0 - (I_0 + I_2)/2\}/\{(I_0 + I_2)/2 - I_3\}$$
$$= \{2I_0 - I_0 - I_2\}/\{I_0 + I_2 - 2I_3\}$$
$$= \{I_0 - I_2\}/\{I_0 + I_2 - 2I_3\}$$
$$\theta = \tan^{-1}\{(I_0 - I_2)/(I_0 + I_2 - 2I_3)\}$$

For example, when the luminance value $I_0$ is "overexposed" or "underexposed" among the luminance values $I_0$, $I_1$, $I_2$, and $I_3$ with respect to each coordinate position in the four different image data described above, the offset A is expressed by an expression (15) given below by rearranging the above expressions (2') and (4') as shown in [Math. 12] given below:

[Math. 12]

$$\{(I_1-A)/B\}=\{(A-I_3)/B\}$$

$$2A=I_1+I_3$$

$$A=(I_1+I_3) \quad (15)$$

An expression (16) given below is derived by solving the above expression (15) with regard to the phase θ based on the above expressions (3') and (4') as shown in [Math. 13] given below:

[Math. 13]

$$\begin{aligned}\tan\theta &= \sin\theta/\cos\theta \pounds\eta \quad (16)\\ &= \{(A-I_2)/B\}/\{(A-I_3)/B\}\\ &= (A-I_2)/(A-I_3)\\ &= \{((I_1+I_3)/2-I_2\}/\{(I_1+I_3)/2-I_3\}\\ &= \{I_1+I_3-2I_2\}/\{I_1+I_3-2I_3\}\\ &= \{I_1+I_3-2I_2\}/\{I_1-I_3\}\\ \theta &= \tan^{-1}\{(I_1+I_3-2I_2)/(I_1-I_3)\}\end{aligned}$$

For example, when the luminance value $I_2$ is "overexposed" or "underexposed" among the luminance values $I_0$, $I_1$, $I_2$, and $I_3$ with respect to each coordinate position in the four different image data described above, an expression (17) given below is derived by solving the above expression (15) with regard to the phase θ based on the above expressions (1') and (2') as shown in [Math. 14] given below:

[Math. 14]

$$\begin{aligned}\tan\theta &= \sin\theta/\cos\theta \quad (17)\\ \tan\theta &= \{(I_0-A)/B\}/\{(I_1-A)/B\}\\ &= (I_0-A)/(I_1-A)\\ &= \{I_0-(I_1+I_3)/2\}/\{I_1-(I_1+I_3)/2\}\\ &= \{2I_0-I_1-I_3\}/\{2I_1-I_1-I_3\}\\ &= \{2I_0-I_1-I_3\}/\{I_1-I_3\}\\ \theta &= \tan^{-1}\{(2I_0-I_1-I_3)/(I_1-I_3)\}\end{aligned}$$

When two of the four luminance values with respect to a predetermined coordinate position in the four different image data described above are "overexposed", the phase θ of the light pattern with respect to the coordinate position is calculated, based on the two remaining "non-overexposed" luminance values other than the "overexposed" luminance values.

Figure 6:
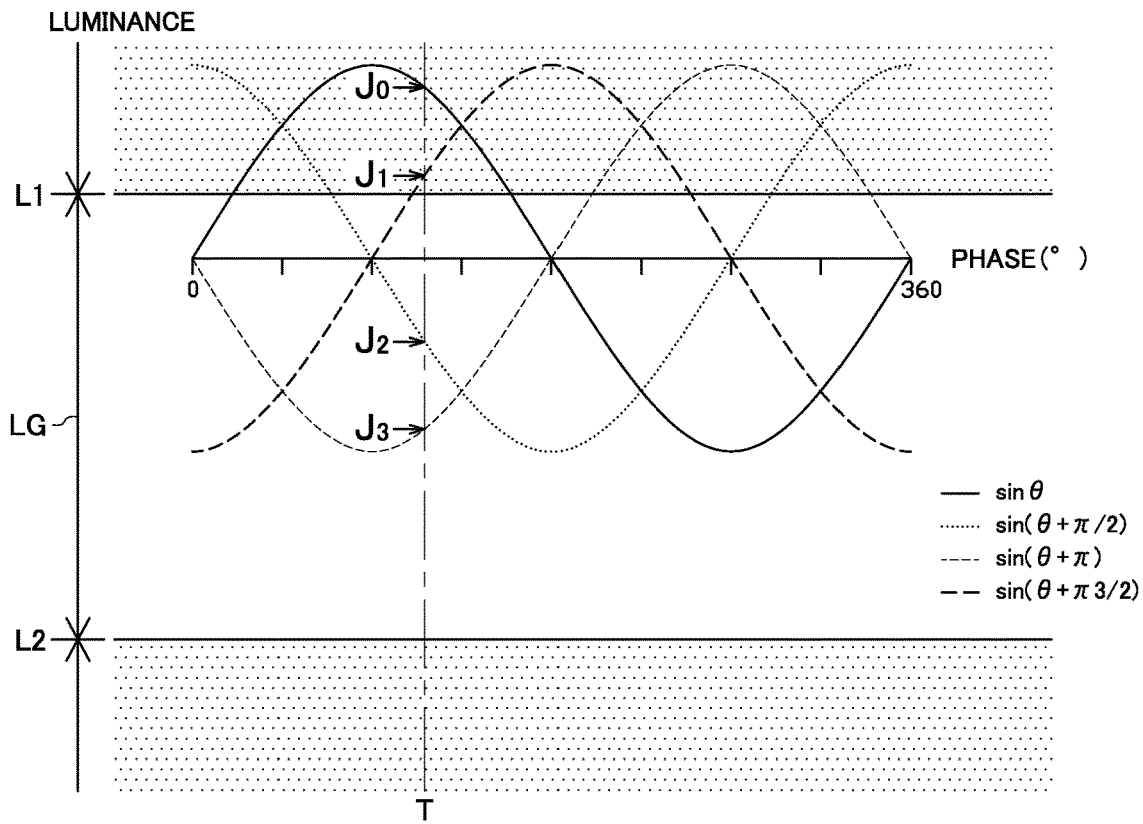
FIG. 6 is a graph showing a relationship between the luminance value of the light pattern and the luminance dynamic range of the imaging element in the state that part of the luminance values are overexposed.

For example, as shown in FIG. 6, in the process of determining the phase T of the light pattern with respect to the predetermined coordinate position, when two luminance values $J_0$ and $J_1$ are "overexposed" (are higher than the overexposed luminance level L1) among the four luminance values $J_0$, $J_1$, $J_2$ and $J_3$ with respect to the coordinate position, the phase T of the light pattern with respect to the coordinate position is calculated, based on the two remaining "non-overexposed" luminance values $J_2$ and $J_3$ (that are lower than the overexposed luminance level L1).

This configuration enables the phase θ of the light pattern to be calculated, even when a range of approximately 50 to 80% of the amplitude of the light pattern (shown in FIG. 6) is higher than the overexposed luminance level L1 of the imaging element.

Similarly, when two of the four luminance values with respect to the predetermined coordinate position in the four different image data are "underexposed", the phase θ of the light pattern with respect to the coordinate position is calculated, based on the two remaining "non-underexposed" luminance values other than the "underexposed" luminance values.

Figure 7:
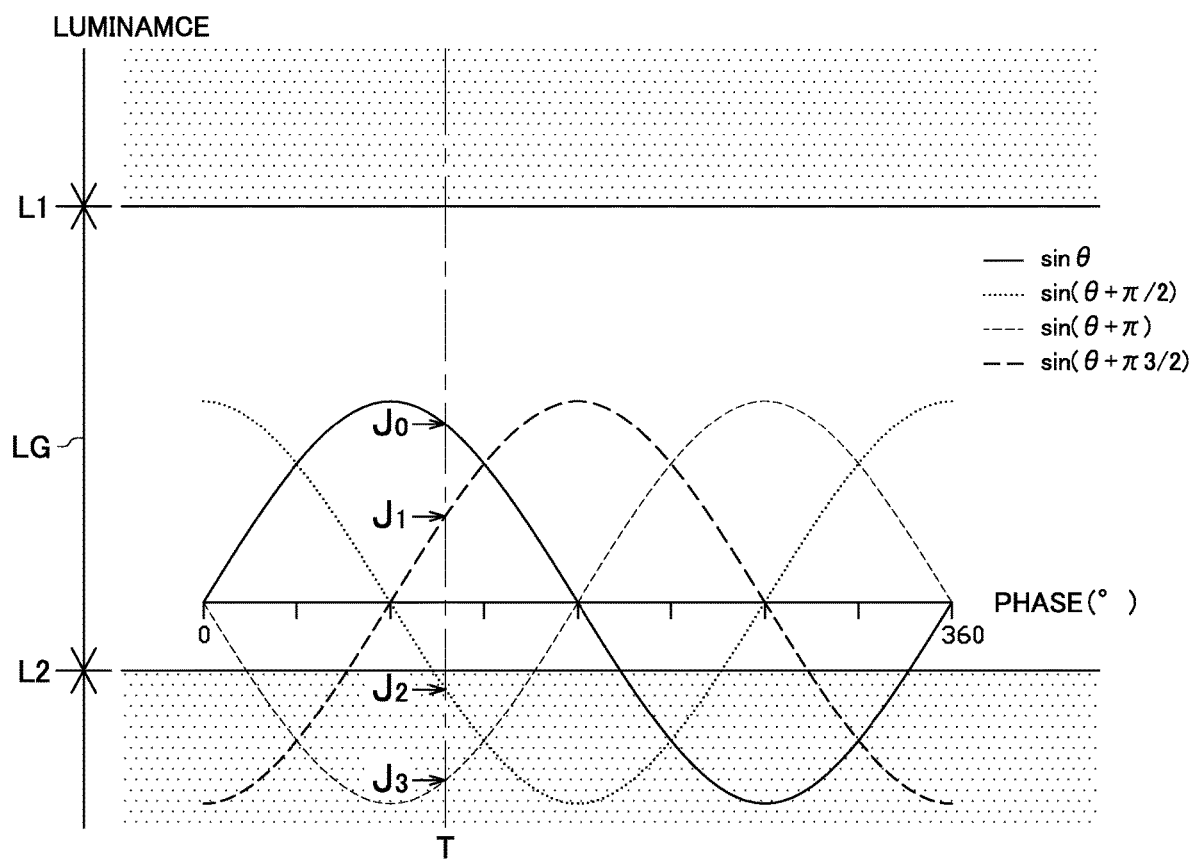
FIG. 7 is a graph showing a relationship between the luminance value of the light pattern and the luminance dynamic range of the imaging element in the state that part of the luminance values are underexposed.

For example, as shown in FIG. 7, in the process of determining the phase T of the light pattern with respect to the predetermined coordinate position, when two luminance values $J_2$ and $J_3$ are "underexposed" (are lower than the underexposed luminance level L2) among the four luminance values $J_0$, $J_1$, $J_2$ and $J_3$ with respect to the coordinate position, the phase T of the light pattern with respect to the coordinate position is calculated, based on the two remaining "non-underexposed" luminance values $J_0$ and $J_1$ (that are higher than the underexposed luminance level L2).

This configuration enables the phase θ of the light pattern to be calculated, even when a range of approximately 50 to 80% of the amplitude of the light pattern (shown in FIG. 7) is lower than the underexposed luminance level L2 of the imaging element.

For example, when the two luminance values I2 and $I_3$ are "overexposed" or "underexposed" among the luminance values $I_0$, $I_1$, $I_2$, and $I_3$ with respect to each coordinate position in the four different image data described above, the offset A is expressed by an expression (18) given below, based on the expression (1), the expression (2) and the proportional constant K described above, for example, by using a calculation technique described in Japanese Patent No. 2016-211986A (as shown in the paragraphs [0064] to [0077]):

[Math. 15]

$$A=(I_0+I_1)\pm\sqrt{\{(I_0+I_1)^2-(2-K^2)I_0^2I_1^2\}} \quad (18)$$

An expression (19) given below is derived by solving the above expression (18) with regard to the phase θ based on the above expressions (1') and (2') as shown in [Math. 16] given below:

[Math. 16]

$$\begin{aligned}\tan\theta &= \sin\theta/\cos\theta \quad (19)\\ &= \{(I_0-A)/B\}/\{(I_1-A)/B\}\\ &= (I_0-A)/(I_1-A)\\ \theta &= \tan^{-1}\{(I_0-A)/(I_1-A)\}\end{aligned}$$

The control device 6 subsequently compares the phase θ at each coordinate position calculated as described above with the calibration data stored in the set data storage device 26 described above (the phase at each coordinate position, based on the calibration) to calculate a deviation amount of the coordinate positions (pixels) having an identical phase. The control device 6 then calculates height data (z) with regard to each coordinate position (x,y) in the inspection area, based on the principle of triangulation and stores the height data (z) into the calculation result storage device 25.

For example, when the measured value (phase) at a predetermined coordinate position (x,y) is "10 degrees", the control device 6 detects the position of the value "10 degrees" on the data stored by the calibration. When the value "10 degrees" is located at a position three pixels away from the coordinate position (x,y), this means that the fringe of the light pattern is deviated by three pixels. Height data (z) at the coordinate position (x,y) is determinable, based on the irradiation angle of the light pattern and the deviation amount of the fringe of the light pattern, by the principle of triangulation.

The control device 6 subsequently detects a printing range of solder paste that is higher than the reference plane, based on the height data at respective coordinate positions in a predetermined inspection area obtained as described above, and integrates the heights in respective locations in this range, so as to calculate the printing amount of solder paste.

The control device 6 subsequently compares the obtained data, for example, the position, the area, the height or the amount of solder paste, with reference data that is stored in advance in the set data storage device 26, and determines whether the result of comparison is within an allowable range or not, so as to perform good/poor quality judgement of the printing state of solder paste in the inspection area.

While performing the above series of processing, the control device 6 drives and controls the motors 15 and 16 to move the printed circuit board 2 to a next inspection area. The control device 6 subsequently repeats the above series of processing with regard to all the inspection areas and then concludes inspection of the entire printed circuit board 2.

As described above in detail, the configuration of this embodiment shifts the phase of the light pattern which the printed circuit board 2 is irradiated with, in four different ways and takes images of the irradiated printed circuit board 2 under the respective light patterns of different phases, so as to obtain four different image data.

In the process of performing three-dimensional measurement based on these four different image data by the phase shift method, the configuration of the embodiment extracts not less than two but less than four luminance values that are neither overexposed nor underexposed, among the four luminance values with respect to a predetermined coordinate position on the image data, and performs height measurement at the predetermined coordinate position, based on the extracted luminance values.

Even when part of the four luminance values is "overexposed" or "underexposed" at a predetermined coordinate position, the configuration of the embodiment performs height measurement by using not less than two but less than four remaining luminance values that are neither overexposed nor underexposed.

This configuration expands the luminance dynamic range. As a result, this does not require to perform height measurement multiple number of times (in multiple sets) with changing the luminance conditions, and thereby increases the speed of measurement. Additionally, this configuration enables height measurement data having a less data missing part to be obtained and thereby enhances the measurement accuracy.

Second Embodiment

The following describes a second embodiment with reference to drawings. Like components of the second embodiment to those of the first embodiment are expressed by like reference signs, and their detailed description is omitted.

Figure 8:
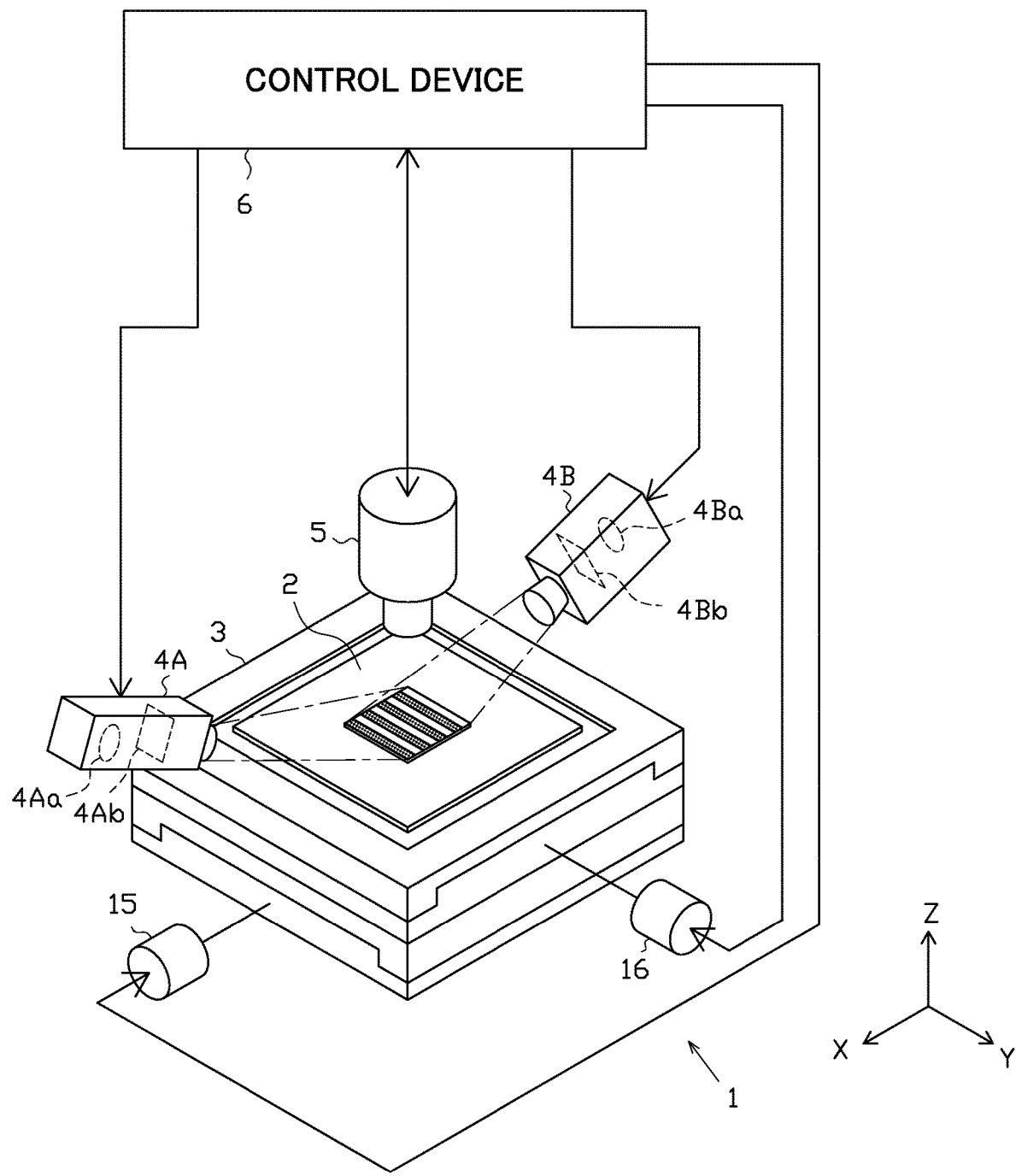
FIG. 8 is a schematic configuration diagram schematically illustrating a substrate inspection apparatus according to another embodiment.

FIG. 8 is a schematic configuration diagram schematically illustrating a substrate inspection apparatus 1 according to this embodiment. As illustrated in this drawing, the substrate inspection apparatus 1 includes a mounting table 3, two illumination devices (a first illumination device 4A serving as the first irradiation unit and a second illumination device 4B serving as the second irradiation unit) configured to irradiate a surface of a printed circuit board 2 obliquely downward with a predetermined light pattern, a camera 5, and a control device 6.

The first illumination device 4A includes a first light source 4Aa configured to emit predetermined light, and a first liquid crystal grating 4Ab configured to convert the light from the first light source 4Aa into a first light pattern having a light intensity distribution in a sinusoidal shape (fringe shape). The first illumination device 4A is configured to irradiate the printed circuit board 2 obliquely downward with the first light pattern in the fringe shape having multiple different phases (the phase shifted by ¼ pitch each, "0 degree", "90 degrees", "180 degrees" and "270 degrees" according to the embodiment). A mechanism of performing switching control of the grating mode in the first liquid crystal grating 4Ab corresponds to the first phase controller.

Similarly, the second illumination device 4B includes a second light source 4Ba configured to emit predetermined light, and a second liquid crystal grating 4Bb configured to convert the light from the second light source 4Ba into a second light pattern having a light intensity distribution in a sinusoidal shape (fringe shape). The second illumination device 4B is configured to irradiate the printed circuit board 2 obliquely downward with the second light pattern in the fringe shape having multiple different phases (the phase shifted by ¼ pitch each, "0 degree", "90 degrees", "180 degrees" and "270 degrees" according to the embodiment). A mechanism of performing switching control of the grating mode in the second liquid crystal grating 4Bb corresponds to the second phase controller.

Each of the liquid crystal gratings 4Ab and 4Bb forms a grating pattern in a fringe shape including "bright portions" of the high light transmittance and "dark portions" of the low light transmittance, like the liquid crystal grating 4b of the first embodiment. The light which the printed circuit board 2 is irradiated with through these liquid crystal gratings 4Ab and 4Bb is a light pattern having a light intensity distribution in a sinusoidal shape.

According to the embodiment, the respective illumination devices 4A and 4B are placed at positions opposed to each other across the printed circuit board 2 in a planar view (X-Y plane) viewed along an approximately vertical direction (Z-axis direction) that is an imaging direction of the camera 5. The position where the first illumination device 4A is placed corresponds to the first position, and the position where the second illumination device 4B is placed corresponds to the second position according to the embodiment.

An inspection procedure of the printed circuit board 2 by the substrate inspection device 1 according to this embodiment is described below in detail. The inspection procedure first performs calibration for the purpose of understanding a variation in the light pattern (phase distribution). The procedure of this embodiment respectively performs calibration with respect to the first liquid crystal grating 4Ab (the first light pattern) and calibration with respect to the second liquid crystal grating 4Bb (the second light pattern) by the procedure of calibration described above with regard to the first embodiment.

The procedure of this embodiment also specifies a gain B, an offset A, and a relationship between the gain B and the offset A of the light pattern in the respective pixels with respect to each of the first liquid crystal grating 4Ab and the second liquid crystal grating 4Bb and stores these specified data as calibration data into the set data storage device 26 by a procedure similar to that of the first embodiment described above.

The following describes in detail an inspection routine performed with respect to each inspection area with reference to the flowchart of FIG. 9. This inspection routine is performed by the control device 6.

The control device 6 first drives and controls the motors 15 and 16 to move the printed circuit board 2 and to adjust the field of view of the camera 5 to a predetermined inspection area on the printed circuit board 2.

After conclusion of the positioning of the inspection area, the control device 6 performs an image data obtaining process at step S1.

More specifically, like the first embodiment, the control device 6 drives and controls the first illumination device 4A to irradiate the inspection area with the first light pattern and sequentially shifts the phase of the first light pattern by ¼ pitch (90 degrees) each. The control device 6 also drives and controls the camera 5 to sequentially take images of the inspection area irradiated with the first light pattern having the phase shifted by 90 degrees each, so as to obtain image data of four picture planes.

The control device 6 then similarly drives and controls the second illumination device 4B to irradiate the inspection area with the second light pattern and sequentially shifts the phase of the second light pattern by ¼ pitch (90 degrees) each. The control device 6 also drives and controls the camera 5 to sequentially take images of the inspection area irradiated with the second light pattern having the phase shifted by 90 degrees each, so as to obtain image data of four picture planes.

Accordingly, the control device 6 obtains image data of a total of eight picture planes, i.e., the image data of the four picture planes taken under the first light pattern having the phase shifted in four different ways and the image data of the four picture planes taken under the second light pattern having the phase shifted in four different ways.

The control device 6 subsequently performs a height data calculation process at step S2. More specifically, the control device 6 performs height measurement at each coordinate position (pixel), based on the four different image data obtained under the first light pattern at step S1 described above (first height measurement), and also performs height measurement at each coordinate position (pixel), based on the four different image data obtained under the second light pattern at step S1 described above.

More specifically, by a procedure similar to that of the first embodiment described above, the control device 6 calculates the phase θ based on the four luminance values when none of the four luminance values is "overexposed" or like with respect to each coordinate position; calculates the phase θ based on the three remaining luminance values when one luminance value is "overexposed" or the like; and calculates the phase θ based on the two remaining luminance values when two luminance values are "overexposed" or the like.

The control device 6 subsequently compares the phase θ at each coordinate position (pixel) calculated as described above with the calibration data stored in the set data storage device 26 described above (the phase at each pixel, based on the calibration) to calculate a deviation amount of pixels having an identical phase. The control device 6 then calculates height data (z) with regard to each coordinate position (x,y) in the inspection area, based on the principle of triangulation.

The height data at each coordinate position calculated based on the four different image data obtained under the first light pattern is stored as "first height data" in the calculation result storage device 25. The height data at each coordinate position calculated based on the four different image data obtained under the second light pattern is stored as "second height data" in the calculation result storage device 25.

At step S3, the control device 6 then respectively converts the "first height data" and the "second height data" calculated at step S2 described above, into height data on the basis of a predetermined reference plane (for example, a land which solder paste is printed on).

The data converted from the "first height data" is stored as "reference plane-based first height data" into the calculation result storage device 25, and the data converted from the "second height data" is stored as "reference plane-based second height data" into the calculation result storage device 25.

The control device 6 subsequently performs an integration process to integrate the "reference plane-based first height data" with the "reference plane-based second height data" at step S4.

According to the embodiment, the integration process calculates a mean value of the "reference plane-based first height data" and the "reference plane-based second height data" with regard to each pixel position (x,y) in the inspection areas, as "true height data" with regard to the pixel position (x,y) and stores the "true height data" into the calculation result storage device 25.

According to this embodiment, a procedure employed to calculate the mean value simply averages the "reference plane-based first height data" and the "reference plane-based second height data".

The control device 6 subsequently performs a good/poor quality judgement process at step S5. More specifically, the control device 6 detects a printing range of solder paste that is higher than the reference plane, based on the "true height data (z)" with regard to each coordinate position (x,y) in the inspection area obtained at step S4 described above, and integrates the heights in respective locations in this range, so as to calculate the printing amount of solder paste.

The control device 6 subsequently compares the obtained data, for example, the position, the area, the height or the amount of solder paste, with reference data that is stored in advance in the set data storage device 26, and determines whether the result of comparison is within an allowable range or not, so as to perform good/poor quality judgement of the printing state of solder paste in the inspection area. The control device 6 then terminates the inspection routine with regard to this inspection area.

While performing the good/poor quality judgment process described above, the control device 6 drives and controls the motors 15 and 16 to move the printed circuit board 2 to a next inspection area. The control device 6 subsequently repeats the above series of processing (inspection routine) with regard to all the inspection areas and then concludes inspection of the entire printed circuit board 2.

As described above in detail, this embodiment has similar functions and advantageous effects to those of the first embodiment.

Additionally, the configuration of this embodiment performs the first height measurement based on the four different image data taken and obtained under the first light pattern, performs the second height measurement based on the four different image data taken and obtained under the second light pattern, and calculates the height measurement data with regard to each pixel position in the inspection area, based on the results of both these height measurements.

As a result, this configuration enables height measurement data having a further less data missing part to be obtained and thereby further enhances the measurement accuracy.

For example, when four luminance values that are neither "overexposed" nor "underexposed" are obtained with respect to a predetermined coordinate position from the four different image data obtained under the first light pattern and four luminance values that are neither "overexposed" nor "underexposed" are obtained with regard to this coordinate position from the four different image data obtained under the second light pattern, the procedure of this embodiment enables the "true height data" with regard to this coordinate position to be obtained with high measurement accuracy, like the conventional procedure.

When four luminance values that are neither "overexposed" nor "underexposed" are obtained with respect to a predetermined coordinate position from the four different image data obtained under the first light pattern (or under the second light pattern) and three or two luminance values that are neither "overexposed" nor "underexposed" are obtained with regard to this coordinate position from the four different image data obtained under the second light pattern (or under the first light pattern), the procedure of this embodiment calculates height measurement data using the three or two luminance values with respect to the second light pattern (or the first light pattern), unlike the conventional procedure. This configuration improves the measurement accuracy of the "true height data".

When four, three or two luminance values that are neither "overexposed" nor "underexposed" are obtained with respect to a predetermined coordinate position from the four different image data obtained under the first light pattern (or under the second light pattern) but two or more luminance values that are neither "overexposed" nor "underexposed" are not obtained with regard to this coordinate position from the four different image data obtained under the second light pattern (or under the first light pattern), however, the procedure of this embodiment uses the height measurement data calculated by using the four, three or two luminance values with respect to the first light pattern (or the second light pattern), as the "true height data", like the conventional procedure.

When three luminance values that are neither "overexposed" nor "underexposed" are obtained with respect to a predetermined coordinate position from the four different image data obtained under the first light pattern (or under the second light pattern) and three or two luminance values that are neither "overexposed" nor "underexposed" with regard to this coordinate position from the four different image data obtained under the second light pattern (or under the first light pattern), on the other hand, the procedure of this embodiment calculates height measurement data using the three luminance values with respect to the first light pattern (or the second light pattern) and calculates height measurement data using the three or two luminance values with respect to the second light pattern (or the first light pattern), unlike the conventional procedure. This configuration accordingly obtains the "true height data" with respect to this coordinate position, which is a data missing part in the conventional procedure.

Similarly, when two luminance values that are neither "overexposed" nor "underexposed" with respect to a predetermined coordinate position from the four different image data obtained under the first light pattern and two luminance values that are neither "overexposed" nor "underexposed" with regard to this coordinate position from the four different image data obtained under the second light pattern, the procedure of this embodiment calculates height measurement data using the two luminance values with respect to the first light pattern and calculates height measurement data using the two luminance values with respect to the second light pattern, unlike the conventional procedure. This configuration accordingly obtains the "true height data" with respect to this coordinate position, which is a data missing part in the conventional procedure.

The present disclosure is not limited to the description of the above embodiments but may also be implemented, for example, by configurations described below. The present disclosure may further be implemented by other applications and other modifications that are not specifically described below.

(a) The above respective embodiments describe the application of the three-dimensional measurement device to the substrate inspection apparatus 1 configured to measure the height of solder paste printed and formed on the printed circuit board 2. The present disclosure is, however, not limited to this configuration but may be applied to a configuration of measuring the height of another substance, for example, a solder bump formed on a substrate or an electronic component mounted on a substrate.

(b) The configuration of the irradiation unit is not limited to the configurations of the above respective embodiments. For example, the above respective embodiments employ the liquid crystal grating 4b (4Ab or 4Bb) as the grating used to convert the light from the light source 4a (the light source 4Aa or 4Ba) into the fringe-shaped light pattern and performs switching control of the liquid crystal grating 4b (4Ab or 4Bb) to shift the phase of the light pattern. This configuration is, however, not essential. For example, a modification may be configured to transfer a grating member by a transfer unit such as a piezo actuator and thereby shift the phase of the light pattern.

(c) In the configurations of the above respective embodiments, the height measurement is performed by the phase shift method, based on the four different image data taken and obtained under the four different light patterns having the phase shifted by 90 degrees each.

This configuration is, however, not essential. An employable configuration may shift the phase of the light pattern in N different ways (n is a natural number of not less than 3) and perform height measurement by the phase shift method, based on N different image data taken and obtained under N different light patterns having different phases.

For example, a modification may be configured to perform height measurement, based on three different image data taken and obtained under three different light patterns having the phase shifted by 120 degrees each.

In the configuration of performing height measurement based on the four different image data taken and obtained under the four different light patterns having the phase shifted by 90 degrees each, however, a procedure may extract three or more luminance values that are neither overexposed nor underexposed among the four luminance values with respect to a predetermined coordinate position on image data and perform height measurement at the predetermined coordinate position based on the extracted three or more luminance values.

In the case of performing height measurement by the phase shift method, using four or three luminance values for height calculation facilitates the calculation process and is likely to obtain the measurement result of the high accuracy. Accordingly, the configuration of the above procedure further increases the speed of measurement and further improves the measurement accuracy.

With a view to further expanding the luminance dynamic range, on the other hand, a procedure may extract two or more luminance values that are neither overexposed nor underexposed among N luminance values with respect to a predetermined coordinate position on image data, based on N different image data (where N is a natural number of not less than 3) and perform height measurement at this coordinate position based on the two or more luminance values.

(d) According to the configuration of the second embodiment described above, the integration process of integrating the "reference plane-based first height data" with the "reference plane-based second height data" (step S4) calculates the mean value obtained by simply averaging the "reference plane-based first height data" and the "reference plane-based second height data" with respect to each coordinate position (x,y) in the inspection area, as "true height data" with respect to the coordinate position (x,y).

This configuration is, however, not essential. In the process of calculating the mean value of the "reference plane-based first height data" and the "reference plane-based second height data", for example, when one of the "reference plane-based first height data" and the "reference plane-based second height data" is data calculated based on the four luminance values that are not "overexposed" or the like and the other is data calculated based on the three remaining luminance values with one luminance value "overexposed" or the like, a modification may be configured to calculate a weighted average according to the number of the luminance values used for the calculation.

When there is a difference between the number of luminance values that are neither overexposed nor underexposed and that are used for calculation of the measurement result of first height measurement and the number of luminance values that are neither overexposed nor underexposed and that are used for calculation of the measurement result of second height measurement, it is possible to obtain the measurement result based on the larger number of luminance values, as the "true height data" or to obtain a calculation result by processing the measurement result based on the larger number of luminance values by a predetermined weight, as the "true height data".

As a result, this configuration enables measurement to be performed by using a larger number of luminance values that are neither overexposed nor underexposed, so as to obtain the "true height data" having a less data missing part and thereby further improves the measurement accuracy.

(e) In the integration process of step S4 described above, a modified configuration may select either the "reference plane-based first height data" or the "reference plane-based second height data" with regard to each coordinate position (x,y) in an inspection area and calculate the selected height data as "true height data" with respect to the coordinate position (x,y), in place of calculating the mean value of the "reference plane-based first height data" and the "reference plane-based second height data".

In the selection of one of the "reference plane-based height data" as described above, for example, when three or more luminance values are "overexposed" or the like with respect to a predetermined coordinate position in the image data obtaining process of step S1 described above and the height data obtained is only one of the "reference plane-based first height data" and the "reference plane-based second height data", the obtained "reference plane-based height data" may be selected.

In the selection of one of the "reference plane-based height data", for example, when one of the "reference plane-based first height data" and the "reference plane-based second height data" is data calculated based on the four luminance values that are not "overexposed" or the like and the other is data calculated based on the three remaining luminance values that are not "overexposed" or the like with one luminance value "overexposed or the like, a modification may be configured to select the "reference plane-based height data" calculated based on the larger number of luminance values that are not "overexposed" or the like.

When one of the data is data calculated based on three luminance values that are not "overexposed" or the like and the other is data calculated based on two luminance values that are not overexposed" or the like the "reference plane-based height data" calculated based on the three luminance values that are not "overexposed" or the like is selected.

In the selection of one of the "reference plane-based height data", a modification may be configured to select appropriate "reference plane-based height data" by taking into account "true height data" with respect to surrounding coordinate positions (x,y) of a predetermined coordinate position (x,y), as "true height data" with respect to the predetermined coordinate position (x,y).

In the integration process of step S4, another modification may obtain the "true height data" with respect to all coordinate positions (x,y) in an inspection area by combining the process of calculating the mean value of the "reference plane-based first height data" and the "reference plane-based second height data" described above with the process of selecting one of the "reference plane-based first height data" and the "reference plane-based second height data".

(f) The configuration of the imaging unit is not limited to the configurations of the above respective embodiments. For example, the above respective embodiments employ the single-plate CMOS sensor as the imaging element. The imaging element employed is, however, not limited to this example but may be, for example, a CCD sensor. The single-plate color image sensor is also not essential.

The issues described above in Background are not characteristic of the single-plate color image sensor but may occur even when the printed circuit board 2 simply includes bright portions and dark portions.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

1 . . . substrate inspection apparatus, 2 . . . printed circuit board, 4 . . . illumination device, 4a . . . light source, 4b . . . liquid crystal grating, 5 . . . camera, 6 . . . control device, 24 . . . image data storage device, 25 . . .

calculation result storage device, 26 . . . set data storage device, $I_0, I_1, I_2, I_3$ . . . luminance values, A . . . offset, B . . . gain, K . . . proportional constant, L1 . . . overexposed luminance level, L2 . . . underexposed luminance level, LG . . . luminance dynamic range

What is claimed is:

1. A three-dimensional measurement device that performs three-dimensional measurement of a measured object using a phase shift method, the three-dimensional measurement device comprising:
an irradiator that irradiates the measured object with a predetermined light pattern having a light intensity distribution in a fringe shape;
a control device that shifts a phase of the light pattern radiated from the irradiator in N different ways, where N is a natural number of not less than 3; and
an imaging device that takes an image of the measured object irradiated with the light pattern, wherein
the control device executes three-dimensional measurement of the measured object by the phase shift method based on N different image data taken under the light pattern having the phase shifted in the N different ways,
the control device executes the three-dimensional measurement by:
obtaining N luminance values with respect to a predetermined coordinate position on the image data based on the N different image data;
extracting luminance values of not less than two but less than N from among the N luminance values, wherein the extracted luminance values are neither overexposed nor underexposed; and
executing height measurement at the predetermined coordinate position based on the luminance values of not less than two but less than N.

2. A three-dimensional measurement device that performs three-dimensional measurement of a measured object using a phase shift method, the three-dimensional measurement device comprising:
an irradiator that irradiates the measured object with a predetermined light pattern having a light intensity distribution in a fringe shape;
a control device that shifts a phase of the light pattern radiated from the irradiator by 90 degrees in four different ways; and
an imaging device that takes an image of the measured object irradiated with the light pattern, wherein
the control device executes three-dimensional measurement of the measured object by the phase shift method based on four different image data taken under the light pattern having the phase shifted in the four different ways,
the control device executes the three-dimensional measurement by:
obtaining four luminance values with respect to a predetermined coordinate position on the image data based on the four different image data;
extracting three or more luminance values that are neither overexposed nor underexposed from among the four luminance values; and
executing height measurement at the predetermined coordinate position based on the three or more luminance values.

3. A three-dimensional measurement device that performs three-dimensional measurement of a measured object using a phase shift method, the three-dimensional measurement device comprising:
a first irradiator that irradiates the measured object with a first light pattern having a light intensity distribution in a fringe shape;
a second irradiator that irradiates the measured object with a second light pattern having a light intensity distribution in a fringe shape;
a control device that:
shifts a phase of the first light pattern radiated from the first irradiator in N different ways, where N is a natural number of not less than 3, and
shifts a phase of the second light pattern radiated from the second irradiator in N different ways, where N is a natural number of not less than 3; and
an imaging device that takes an image of the measured object irradiated with the first light pattern or with the second light pattern, wherein
the control device executes three-dimensional measurement of the measured object based on image data obtained by the imaging device,
the control device executes the three-dimensional measurement by:
executing first height measurement based on N different image data taken under the first light pattern having the phase shifted in the N different ways,
executing second height measurement based on N different image data taken under the second light pattern having the phase shifted in the N different ways,
calculating height measurement data of the measured object based on a measurement result of the first height measurement and a measurement result of the second height measurement,
the control device executes the first height measurement and the second height measurement by:
obtaining N luminance values with respect to a predetermined coordinate position on the image data based on the N different image data;
extracting luminance values of not less than two but less than N from among the N luminance values, wherein the extracted luminance values are neither overexposed nor underexposed; and
executing height measurement at the predetermined coordinate position based on the luminance values of not less than two but less than N, and
the control device calculates the height measurement data by:
when there is a difference between first and second numbers of the luminance values, wherein the first number is a number of luminance values that are neither overexposed nor underexposed and used for calculation of the first height measurement, and the second number is a number of luminance values that are neither overexposed nor underexposed and used for calculation of the second height measurement,
obtaining, as the height measurement data, the measurement result based on the larger number of luminance values among the first and second numbers, or
obtaining, as the height measurement data, a result of weighting of the measurement result based on the larger number of luminance values by a predetermined weight.

4. The three-dimensional measurement device according to claim 1, wherein
the control device individually determines whether each of the N luminance values with respect to the predetermined coordinate position is neither overexposed nor underexposed.

5. The three-dimensional measurement device according to claim 2, wherein
the control device individually determines whether each of the N luminance values with respect to the predetermined coordinate position is neither overexposed nor underexposed.

6. The three-dimensional measurement device according to claim 3, wherein
the control device individually determines whether each of the N luminance values with respect to the predetermined coordinate position is neither overexposed nor underexposed.

7. The three-dimensional measurement device according to claim 1, wherein
the measured object is a printed circuit board on which solder paste is printed or a wafer substrate on which a solder bump is formed.

8. The three-dimensional measurement device according to claim 2, wherein
the measured object is a printed circuit board on which solder paste is printed or a wafer substrate on which a solder bump is formed.

9. The three-dimensional measurement device according to claim 3, wherein
the measured object is a printed circuit board on which solder paste is printed or a wafer substrate on which a solder bump is formed.

10. The three-dimensional measurement device according to claim 4, wherein
the measured object is a printed circuit board on which solder paste is printed or a wafer substrate on which a solder bump is formed.

11. The three-dimensional measurement device according to claim 5, wherein
the measured object is a printed circuit board on which solder paste is printed or a wafer substrate on which a solder bump is formed.

12. The three-dimensional measurement device according to claim 6, wherein
the measured object is a printed circuit board on which solder paste is printed or a wafer substrate on which a solder bump is formed.

13. A method of performing three-dimensional measurement of a measured object using a phase shift method, the method comprising:
irradiating the measured object with a predetermined light pattern having a light intensity distribution in a fringe shape;
shifting a phase of the light pattern in N different ways, where N is a natural number of not less than 3;
taking an image of the measured object irradiated with the light pattern; and
executing three-dimensional measurement of the measured object by the phase shift method based on N different image data taken under the light pattern having the phase shifted in the N different ways, wherein
the executing of the three-dimensional measurement includes:
obtaining N luminance values with respect to a predetermined coordinate position on the image data based on the N different image data;
extracting luminance values of not less than two but less than N from among the N luminance values, wherein the extracted luminance values are neither overexposed nor underexposed; and
executing height measurement at the predetermined coordinate position based on the luminance values of not less than two but less than N.

* * * * *